(12) United States Patent
Vanderloop et al.

(10) Patent No.: US 11,771,003 B2
(45) Date of Patent: Oct. 3, 2023

(54) TRANSFER ASSEMBLY FOR ATTACHMENT TO A FRONT PORTION OF AN AGRICULTURAL VEHICLE AND A METHOD OF USE

(71) Applicants: Robb J. Vanderloop, Kaukauna, WI (US); Carey L. Vanderloop, Wrightstown, WI (US)

(72) Inventors: Robb J. Vanderloop, Kaukauna, WI (US); Carey L. Vanderloop, Wrightstown, WI (US)

( * ) Notice: Subject to any disclaimer, the term of this patent is extended or adjusted under 35 U.S.C. 154(b) by 349 days.

(21) Appl. No.: 17/032,740

(22) Filed: Sep. 25, 2020

(65) Prior Publication Data
US 2022/0098025 A1 Mar. 31, 2022

(51) Int. Cl.
*A01D 42/00* (2006.01)
*F04D 9/02* (2006.01)
(Continued)

(52) U.S. Cl.
CPC ............... *A01D 42/00* (2013.01); *F04B 9/02* (2013.01); *F04B 17/05* (2013.01); *F04B 17/06* (2013.01); *F04B 23/08* (2013.01); *F04B 49/22* (2013.01); *F04C 2/126* (2013.01); *A01C 23/04* (2013.01); *A01C 23/047* (2013.01); *B67D 7/02* (2013.01); *B67D 7/62* (2013.01); *B67D 7/66* (2013.01)

(58) Field of Classification Search
CPC ...... A01D 42/00; A01C 23/04; A01C 23/047; F04B 17/05; F04B 17/06; F04B 23/08; F04B 23/04; F04B 49/22; F04B 9/02; F04C 2/126; F04C 11/00–008; F04D 13/14; F16H 7/02; B67D 7/02; B67D 7/62; B67D 7/66
See application file for complete search history.

(56) References Cited

U.S. PATENT DOCUMENTS 2,606,645 A * 8/1952 William .................... F04D 3/02
 222/413
3,765,724 A * 10/1973 Hatcher ................ E01C 23/088
 299/39.2

(Continued)

FOREIGN PATENT DOCUMENTS

CA 3052603 A1 * 2/2020
CN 10-2011-0037152 * 4/2011
(Continued)

*Primary Examiner* — Charles G Freay
(74) *Attorney, Agent, or Firm* — Amundsen Davis, LLC

(57) ABSTRACT

A transfer assembly for attachment to a front portion of an agricultural vehicle, i.e. forage harvester, and a method of use are disclosed. The transfer assembly includes a frame, a pump and an air compressor, along with appropriate drive mechanisms. The agricultural vehicle has an engine and drive mechanisms including a first driven pulley. The pump is connected to the first driven pulley through second and third driven pulleys. The pump is secured to the frame and has a fluid inlet and a fluid outlet. A transfer pipe routes the fluid or manure away from the pump and has a coupling connected to its second end. The coupling enables a flexible hose to be attached to it so that the fluid or manure can be directed to another location, such as onto a field. The transfer assembly also includes a control mechanism for operating the pump, air compressor, etc.

20 Claims, 4 Drawing Sheets

(51) Int. Cl.
*F04B 17/05* (2006.01)
*F04C 2/12* (2006.01)
*F04B 23/08* (2006.01)
*F04B 49/22* (2006.01)
*F04B 9/02* (2006.01)
*F04B 17/06* (2006.01)
*B67D 7/62* (2010.01)
*A01C 23/04* (2006.01)
*B67D 7/02* (2010.01)
*B67D 7/66* (2010.01)

(56) References Cited

U.S. PATENT DOCUMENTS

2013/0022447 A1* 1/2013 Dieziger ................ F04B 17/05
                                                                                            415/1
2019/0031497 A1* 1/2019 Frizzie .................... B60P 3/225

FOREIGN PATENT DOCUMENTS

| CN | 109404246 A | * | 3/2019 |
| CN | 112042358 A | * | 12/2020 |
| DE | 10 2019129340 A | * | 5/2021 |

\* cited by examiner

TRANSFER ASSEMBLY FOR ATTACHMENT TO A FRONT PORTION OF AN AGRICULTURAL VEHICLE AND A METHOD OF USE

FIELD OF THE INVENTION

This invention relates to a transfer assembly for attachment to a front portion of an agricultural vehicle, such as a forage harvester, and a method of use.

BACKGROUND OF THE INVENTION

Today, agricultural farming is becoming big business. The acreage of a farm is increasing to from a few hundred acres to one or more thousand acres. Many dairy farms now milk over a thousand cows. In daily operations, it may be necessary to pump water, manure or other substances onto a field or from a holding tank.

With dairy farms in particular, the large dairy herds generate a large amount of manure. This manure is typically mixed with water and pumped into a holding pit. This liquid manure is then transported to the various fields to enrich the soil. Typically, the liquid manure is transported to a field in a tanker truck and is then pumped into a temporary holding tank. A flexible hose, which can vary in length, can have one or more spray nozzles secured to its trailing end. The lead end of the flexible hose can be connected to the outlet of a pump. The pump can then be operated to pump the liquid manure through the flexible hose to the spray nozzles where it is deposited onto the field.

It has been found that it takes a large amount of horsepower to run the pump and move the liquid manure through the flexible hose. By mounting the pump onto the front portion of an agricultural vehicle, for example a forage harvester, one can easily move the pump to the various fields in an efficient manner. In addition, when the pump is not required, the pump can be removed and a foraging head can be mounted onto the forage harvester. This eliminates the need to buy a separate vehicle to perform this specific job.

It has also been found that the liquid manure that has been pumped out of the temporary holding tank still needs to be evacuated from the flexible hose. This can be done by inserting a ball having a diameter approximately equal to the internal diameter of the flexible hose. An air compressor can be connected to the front portion of the agricultural vehicle. The air compressor can be used to deliver pressurized air which can force the ball to move through the flexible hose and push any liquid manure that is in front of it out through the spray nozzles. Once the ball reaches the trailing end of the flexible hose, the ball can be recovered. By mounting one or more air compressors onto the front portion of the agricultural vehicle, i.e. forage harvester, one will have an adequate supply of pressurized air to perform this operation.

Now, a transfer assembly has been invented which can be removably attached to the front portion of an agricultural vehicle, i.e. forage harvester. The transfer assembly includes a frame, a fluid pump and an air compressor, along with appropriate drive mechanisms. A method of using this transfer assembly is also taught.

SUMMARY OF THE INVENTION

Briefly, this invention relates to a transfer assembly which can be removably attached to a front portion of an agricultural vehicle, i.e. a forage harvester. The agricultural vehicle has an engine equipped to deliver at least 250 horsepower, a drive pulley, a first driven pulley, and a rotatable belt. The rotatable belt connects the engine to the drive pulley, connects the drive pulley to the first driven pulley, and connects the first driven pulley to the engine.

The transfer assembly includes a frame removably secured to a front portion of the agricultural vehicle. The frame has a first member spaced apart from a second member. Each of the first and second members have an upper arm, a lower arm and a connecting arm joining the upper and lower arms together. A rotatable cross shaft is positioned between the upper arms of the first and second members. The rotatable cross shaft has a first end axially connected to the first driven pulley, located outward of the first member, and a second end. A second driven pulley is located outward of the second member and is axially connected to the second end of the rotatable cross shaft. A third driven pulley is located outward of the second member and is rotatably connected to the second driven pulley. A pump is secured to the first member and is positioned between the first and second members. The pump has a fluid inlet and a fluid outlet, and also has an outwardly extending drive shaft connected to the third driven pulley. A transfer pipe having a first end and a second end is connected at the first end to the fluid outlet of the pump. The transfer pipe serves to route the fluid away from the pump. A coupling is attached to the second end of the transfer pipe and enables a flexible hose to be connected thereto. The transfer assembly also has a control mechanism for operating the pump.

Another embodiment of the transfer assembly includes an air compressor. This transfer assembly can be removably attached to a front portion of an agricultural vehicle, i.e. a forage harvester. The agricultural vehicle has an engine equipped to deliver at least 250 horsepower, a drive pulley, a first driven pulley, and a rotatable belt. The rotatable belt connects the engine to the drive pulley, connects the drive pulley to the first driven pulley, and connects the first driven pulley to the engine. The transfer assembly includes a frame removably secured to a front portion of the agricultural vehicle. The frame has a first member spaced apart from a second member. Each of the first and second members have an upper arm, a lower arm and a connecting arm joining the upper and lower arms together. A rotatable cross shaft is positioned between the upper arms of the first and second members. The rotatable cross shaft has a first end axially connected to the first driven pulley, located outward of the first member, and a second end. A second driven pulley is located outward of the second member and is axially connected to the second end of the rotatable cross shaft. A third driven pulley is located outward of the second member and is rotatably connected to the second driven pulley. A pump is secured to the first member and is positioned between the first and second members. The pump has a fluid inlet and a fluid outlet, and also has an outwardly extending drive shaft connected to the third driven pulley. A transfer pipe having a first end and a second end is connected at the first end to the fluid outlet of the pump. The transfer pipe serves to route the fluid away from the pump. A coupling is attached to the second end of the transfer pipe and enables a flexible hose to be connected thereto. This transfer assembly further includes an air compressor secured to the frame and positioned above the pump. The air compressor is driven by the first drive pulley. The air compressor has an outlet connect to a discharge pipe. The discharge pipe in turn connects with the transfer pipe at an intersecting point downstream of the pump. Lastly, the transfer assembly has a control mechanism for operating the pump and the air compressor.

A method of using a transfer assembly which can be removably attached to a front portion of an agricultural vehicle, i.e. a forage harvester, is also taught. The agricultural vehicle has an engine equipped to deliver at least 250 horsepower, a drive pulley, a first driven pulley, and a rotatable belt. The rotatable belt connects the engine to the drive pulley, connects the drive pulley to the first driven pulley, and connects the first driven pulley to the engine. The transfer assembly includes a frame removably secured to a front portion of the agricultural vehicle. The frame has a first member spaced apart from a second member. Each of the first and second members has an upper arm, a lower arm and a connecting arm joining the upper and lower arms together. A rotatable cross shaft is positioned between the upper arms of the first and second members. The rotatable cross shaft has a first end axially connected to the first driven pulley, located outward of the first member, and a second end. A second driven pulley is located outward of the second member and is axially connected to the second end of the rotatable cross shaft. A third driven pulley is located outward of the second member and is rotatably connected to the second driven pulley. A pump is secured to the first member and is positioned between the first and second members. The pump has a fluid inlet and a fluid outlet, and also has an outwardly extending drive shaft connected to the third driven pulley. A transfer pipe having a first end and a second end is connected at the first end to the fluid outlet of the pump. The transfer pipe extends towards a rear portion of the agricultural vehicle and serves to route fluid away from the pump. A coupling is connected to the second end of the transfer pipe. The coupling enables a flexible hose to be connected thereto.

The transfer assembly also includes air compressor secured to the frame and positioned above the pump. The air compressor is driven by the first drive pulley. The air compressor has an outlet connect to a discharge pipe, and the discharge pipe is connected with the transfer pipe at an intersecting point. The discharge pipe and the transfer pipe have the same internal diameter. A first control valve is positioned across the transfer pipe is located upstream of the intersecting point, and a second control valve is positioned across the discharge pipe. A ball launcher mechanism is connected to the discharge pipe. The ball launcher mechanism is positioned downstream of the air compressor.

The method includes the steps of attaching the transfer assembly onto a front portion of the agricultural vehicle. The front portion of the agricultural vehicle is then positioned adjacent to a holding tank. The pump is then connected, such as by a hose, to the fluid or liquid manure retained in the holding tank. A trailing end of the flexible hose is positioned in a field and the leading end of the flexible hose is connected to the coupling on the transfer pipe. The engine is started and power is supplied to the pump for routing the fluid or liquid manure from the holding tank through the flexible hose and onto the field. The pump can then be turned off when the task is completed.

The general object of this invention is to provide a transfer assembly which can be removably attached to a front portion of an agricultural vehicle. A more specific object of this invention is to provide a transfer assembly which can pump a fluid or liquid manure, as well as supply pressurized air, to distribute the fluid and/or liquid manure onto a field.

Another object of this invention is to provide piping for routing a fluid or liquid manure from a pump which is attached to a front portion of the forage harvester to the rear of the forage harvester, such that a flexible hose can then spread the fluid or liquid manure onto a field.

A further object of this invention is to provide a frame for removably attaching the transfer assembly to a front portion of an agricultural vehicle.

Still another object of this invention is to provide the transfer assembly with an air compressor for providing pressurized air.

Still further, an object of this invention is to provide a method of using the transfer assembly.

Other objects and advantages of the present invention will become more apparent to those skilled in the art in view of the following description and the accompanying drawings.

DETAILED DESCRIPTION OF THE INVENTION

Figure 1:
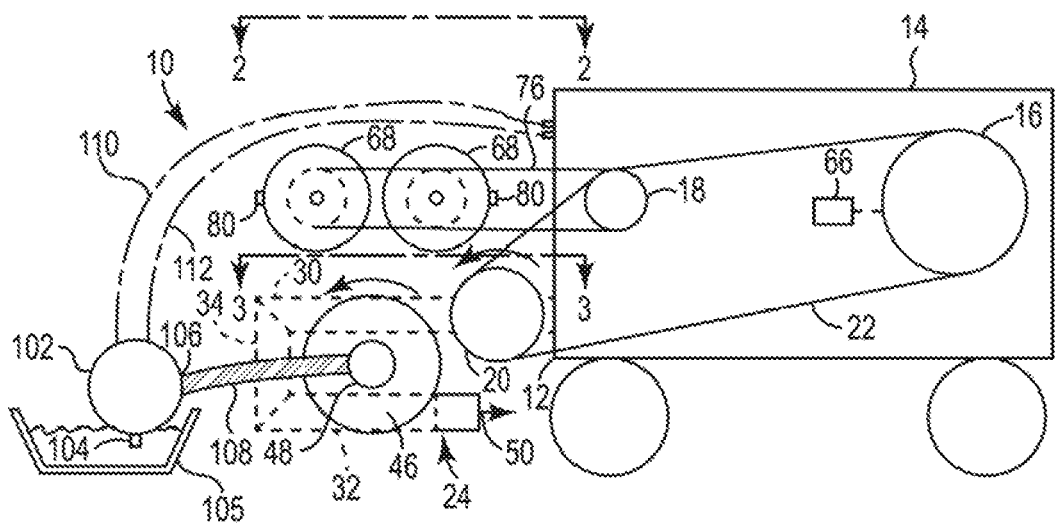
FIG. 1 is a schematic of an agricultural vehicle having a transfer assembly removably attached to a front portion thereof.

Referring to FIG. 1, a transfer assembly 10 is shown attached to a front portion 12 of an agricultural vehicle 14, such as a forage harvester. The agricultural vehicle 14 should be a self-propelled unit. A forage harvester is the preferred agricultural vehicle 14 since it is capable of delivering a great amount of horsepower. By "forage" it is meant food for domestic animals, fodder.

The agricultural vehicle 14 has an engine 16 equipped to deliver at least 250 horsepower (HP). Horsepower (HP) is a unit of power in the United States Customary System, equal to 745.7 watts or 33,000 foot-pounds per minute. Desirably, the engine 16 can range anywhere from between about 250 HP to about 1,200 HP. More desirably, the engine 16 can be rated to deliver from between about 300 HP to about 1,000 HP. More desirably, the engine 16 can be rated to deliver from between about 350 HP to about 900 HP. Even more desirably, the engine 16 can be rated to deliver from between about 500 HP to about 850 HP. Most desirably, the engine 16 can deliver at least about 550 HP.

The agricultural vehicle 14 also has a drive pulley 18, a first driven pulley 20, and a rotatable belt 22. The rotatable belt 22 is a closed loop belt. The rotatable belt 22 connects the engine 16 to the drive pulley 18. This can be accomplished by attaching the belt 22 to a wheel attached to the output shaft (not shown) of the engine 16. The rotatable belt 22 also connects the drive pulley 18 to the first driven pulley 20, and further connects the first driven pulley 20 to the engine 16. The engine 16 can have a direct drive to a clutch (not shown) and the rotatable belt 22. The first driven pulley 20 can be a sheave having a wheel or disk with a grooved rim.

It should be understood that the agricultural vehicle 14 includes a multitude of various parts, hardware, assemblies and components, including wheels, tires, steering wheel, operating controls, etc. which will not be described here but are well known to those skilled in manufacturing and/or servicing such vehicles, including: tractors, forage harvesters, combines, etc.

Referring now to FIGS. 1, 5, 6 and 7, the transfer assembly 10 includes a frame 24 which is sized and shaped to permit the transfer assembly 10 to be removably secured to the front portion 12 of the agricultural vehicle 14. The frame 24 has a first member 26 spaced apart from a second member 28. Each of the first and second members, 26 and 28 respectively, has an upper arm 30, a lower arm 32, and a connecting arm 34. The connecting arm 34 joins the upper and lower arms, 30 and 32 together. Alternatively, each of the first and second members, 26 and 28 respectively, can be of an integral design, having a generally C, J, or U shape or any other desired shape. The frame 24 can also include one or more cross members 35, see FIG. 6, to secure the first member 26 to the second member 28. The cross members(s) 35 can be attached at a right angle or at an acute angle to the first and second members, 26 and 28 respectively.

The transfer assembly 10 further includes a rotatable cross shaft 36 positioned between the upper arms 30, 30 of the first and second members, 26 and 28 respectively. The rotatable cross shaft 36 has a first end 38 and a second end 40. The first end 38 is axially connected to the first driven pulley 20 which is located outward of the first frame member 26.

A second driven pulley 42 is located outward of the second member 28. The second driven pulley 42 is axially connected to the second end 40 of the rotatable cross shaft. The second driven pulley 42 can be a sheave having a wheel or disk with a grooved rim. A third driven pulley 44 is located outward of the second member 28 and is rotatably connected to the second driven pulley 42 by a belt 45. The third driven pulley 44 can be a sheave having a wheel or disk with a grooved rim.

A pump 46 is secured to the first member 26. The pump 46 can be positioned between the first and second frame members 26 and 28 respectively. A portion of the pump 46 can extend beyond one or more of the first and second frame members, 26 and 28 respectively, if desired. The pump 46 can vary in type, design, construction, shape and size. The pump 46 can be a centrifugal pump, a rotary lobe pump or any other kind of pump capable of moving a fluid, a semi-solid and/or a solid that is known to one skilled in the art. A rotary lobe pump can be constructed with 100% positive displacement. The pump 46 has an inlet 48 and an outlet 50, see FIG. 7. The pump 46 also has an outwardly extending drive shaft 52 connected to the third driven pulley 44, see FIG. 5. Some pumps 46 are good at pumping fluid, such as water, which contain few if any solid materials. Other pumps are designed to pump a fluid which may contain semi-solid particles or solid particles. If one needs to pump a slurry which may contain semi-solid or solid particles, such as manure, mud, etc., then the appropriate pump 46 should be utilized.

The pump 46 can have a flow rate of from between about 700 gallons per minute (gpm) to about 5,000 gpm. Desirably, the pump 46 has a flow rate of from between about 1,000 gpm to about 4,500 gpm. More desirably, the pump 46 has a flow rate of from between about 1,500 gpm about 4,000 gpm. Even more desirably, the pump 46 has a flow rate of from between about 2,000 gpm to about 3,500 gpm. Most desirably, the pump 46 has a flow rate of at least about 2,200 gpm.

As noted above, the size of the pump 46 can vary. For pumping water or liquid manure onto a field, it has been found that the suction size of the pump 46 can range from about 6 inches to about 8 inches. The discharge size of the pump 46 can range from between about 6 inches to about 10 inches. When pumping cow manure, the pump 46 should be able to handle semi-solid and solid matter. Some pumps 46 can handle solid matter up to about 3 inches in length. The pump 46 can operate at a variety of speeds. A speed ranging from about 1,000 revolutions per minute (rpm) to about 2,500 rpm should be sufficient for most applications. A speed above 2,500 rpm may be seldom needed. The required horsepower (HP) needed to run the pump 46 can vary. Normally, the horsepower needed to operate the pump 46 can range from between about 250 HP to about 800 HP. Desirably, the horsepower needed to operate the pump 46 is less than about 750 HP. The pump 46 can be driven by a belt 45.

Referring again to FIG. 5, the outside diameter of the first, second and third driven pulleys, 20, 42 and 44 respectively, can vary. It should be understood that by varying the size of the outside diameter of each of the first, second and third driven pulleys, 20, 42 and 44 respectively, one can change the operating speed of the pump 46. Normally, the outside diameter of the first driven pulley 20 is equal to the outside diameter of the second driven pulley 42. The outside diameter of the second driven pulley 42 is normally larger than the outside diameter of the third driven pulley 44. By using a third driven pulley 44 having a smaller outside diameter than the second driven pulley 42, one can increase the speed of the drive shaft 52 which is connected to the pump 46. Typically, the outside diameter of the third driven pulley 44 is less than the outside diameter of the second driven pulley 42. A ratio between the outside diameter of the third driven pulley 44 to the second driven pulley 42 can be 1:2; 1:3, 1:4, 1:5 up to 1:10. The outside diameter of the third driven pulley 44 is generally smaller than the outside diameter of the second driven pulley 42 but could be reversed, if needed.

Figure 4:
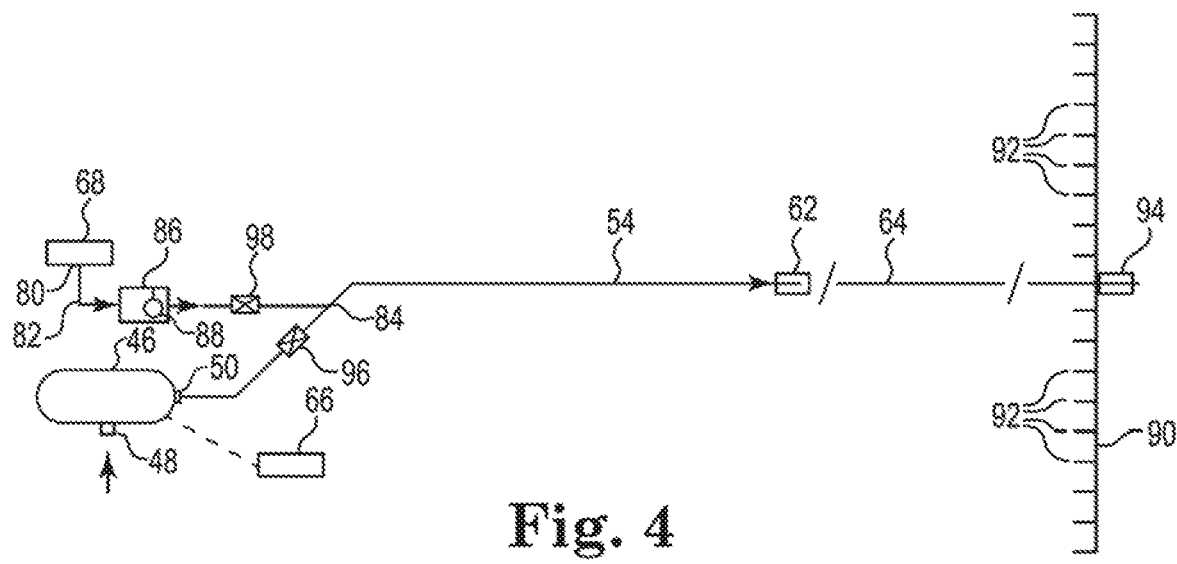
FIG. 4 is a schematic of the pump, air compressor, ball launcher mechanism, transfer pipe, discharge pipe, and control valves.
Figure 5:
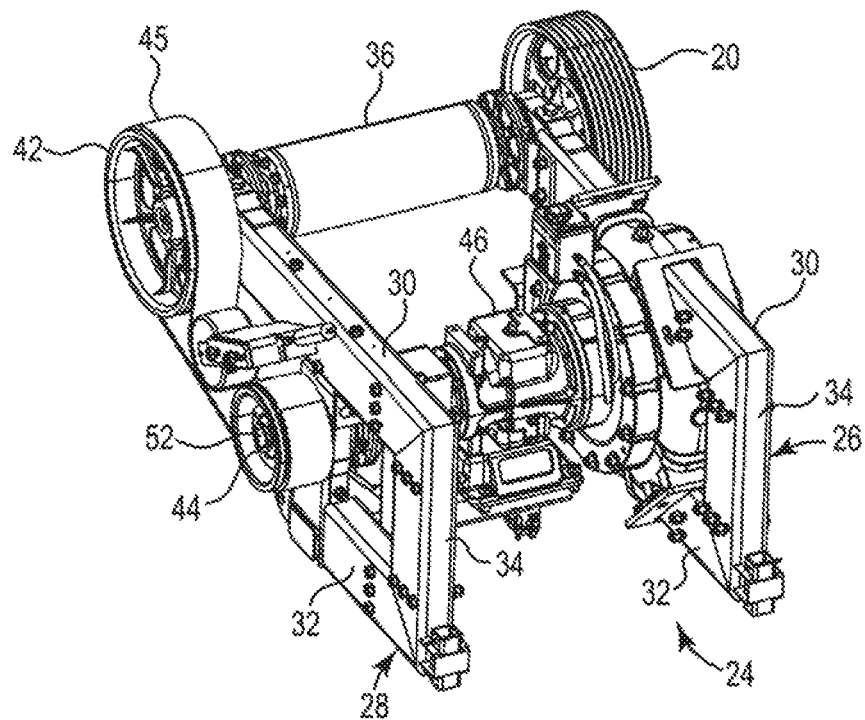
FIG. 5 is a perspective view of the transfer assembly.
Figure 7:
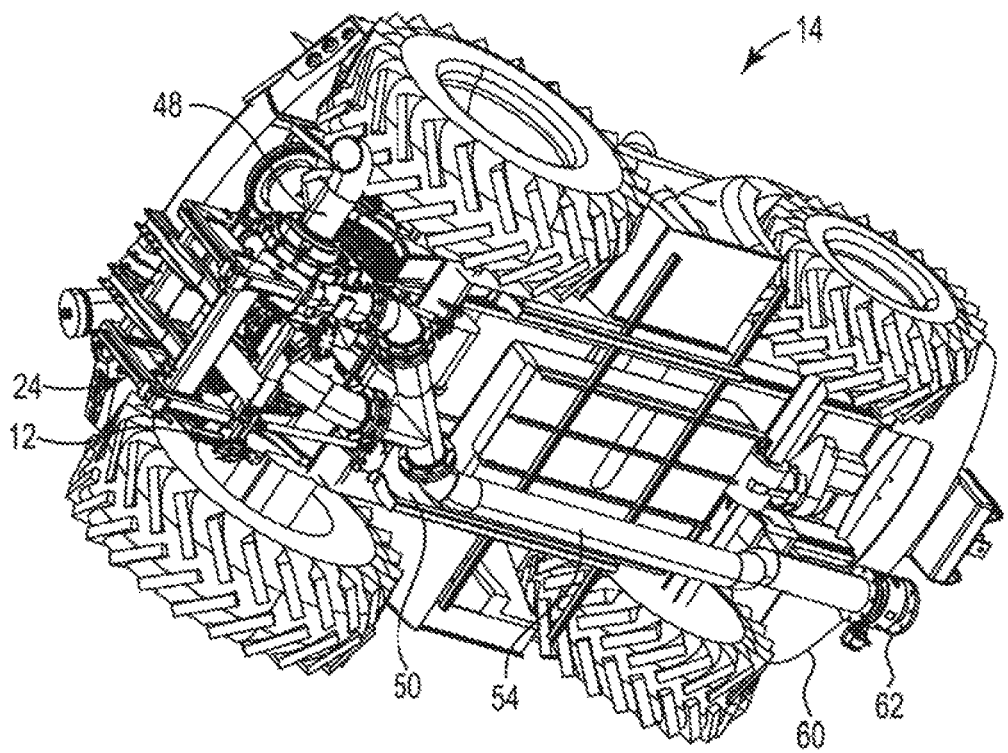
FIG. 7 is a perspective view of the undercarriage of an agricultural vehicle, i.e. a forage harvester, showing the transfer assembly attached to the front portion thereof and the transfer pipe extending to the rear of the vehicle.
Figure 8:
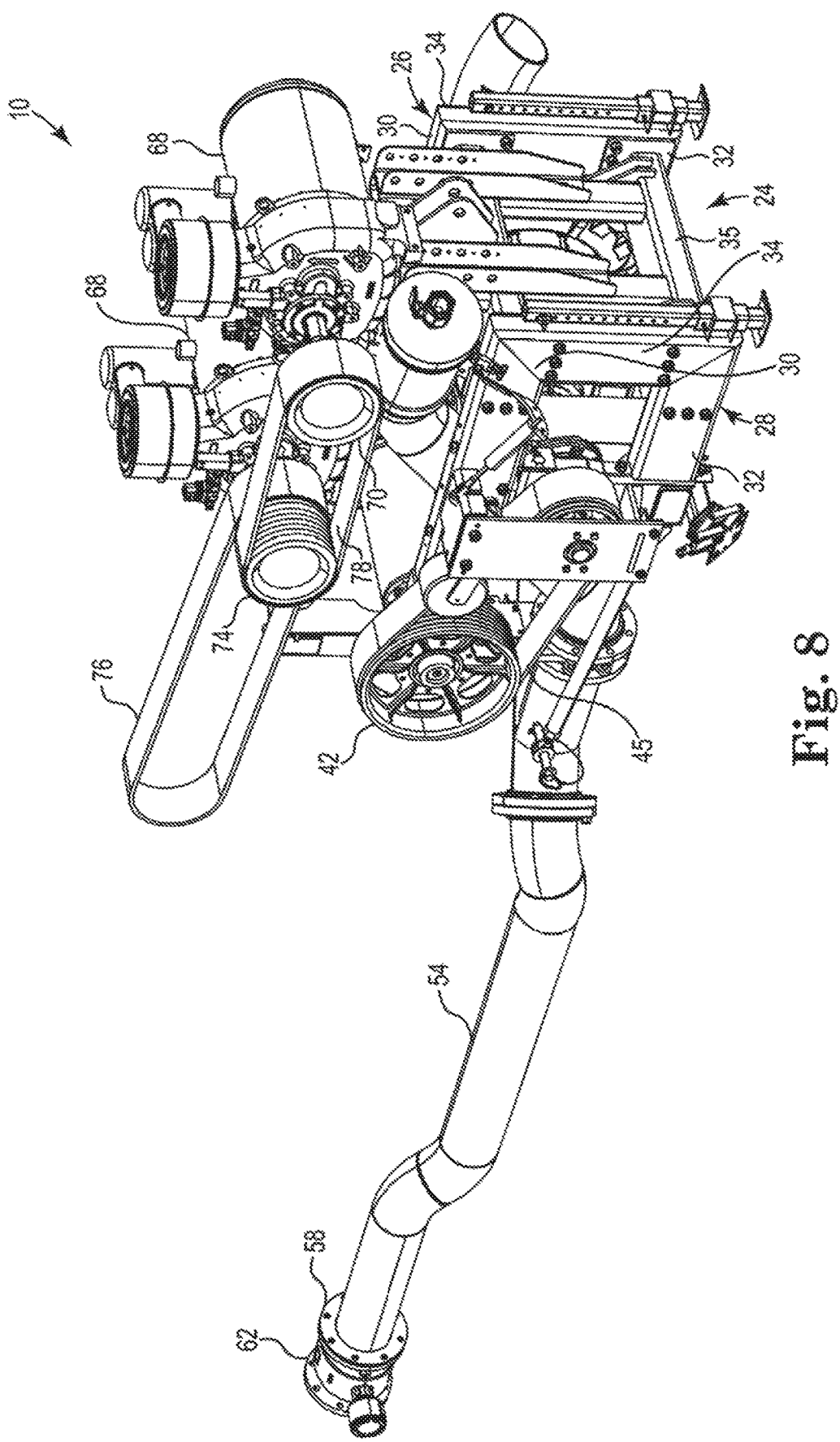
FIG. 8 is a perspective view of the transfer assembly including a pair of air compressors.

Referring now to FIGS. 4, 7 and 8, the transfer assembly 10 further includes a transfer pipe 54 having a first end 56 and a second end 58. The internal diameter of the transfer pipe 54 can vary. The internal diameter of the transfer pipe 54 can range from between about 4 inches to about 10 inches. Desirably, the internal diameter of the transfer pipe 54 ranges from between about 6 inches to about 10 inches. More desirably, the internal diameter of the transfer pipe 54 ranges from between about 6 inches to 8 inches. Most desirably, the internal diameter of the transfer pipe 54 is about 5 inches. Even more desirably, the internal diameter of the transfer pipe 54 is about 4 inches.

The first end 56 of the transfer pipe 54 is connected to the fluid outlet 50 of the pump 46, see FIG. 7. The transfer pipe 54 extends rearward towards a rear portion 60 of the agricultural vehicle 14. The transfer pipe 54 functions to route fluid (water, liquid manure, semi-solids and even some solids) away from the pump 46.

Still referring to FIGS. 4, 7 and 8, a coupling 62 is connected to the second end 58 of the transfer pipe 54. The coupling 62 enables a flexible hose 64, see FIG. 4, to be connected thereto. The internal diameter of the flexible hose 64 can vary in size. The internal diameter of the flexible hose 64 can range from between about 4 inches to about 10 inches. Desirably, the internal diameter of the flexible hose 64 ranges from between about 6 inches to about 10 inches.

More desirably, the internal diameter of the flexible hose 64 ranges from between about 6 inches to 8 inches. Most desirably, the internal diameter of the flexible hose 64 is about 5 inches. Even more desirably, the internal diameter of the flexible hose 64 is about 4 inches.

Referring again to FIG. 1, the transfer assembly 10 also includes a control mechanism 66 for operating the pump 46. The control mechanism 66 is capable of turning the pump 46 on and off. The control mechanism 66 may also control the speed of the pump 46 via a clutch and gear mechanism (not shown). Various types of control mechanisms 66 are commercially available and could be used in this invention. The control mechanism 66 could also control the operation of one or more air compressors 68, 68. The control mechanism 66 can turn the air compressor(s) 68 on and off. The control mechanism 66 could also control the speed of one or more air compressors 68, 68 via a clutch and gear mechanism (not shown).

Figure 2:
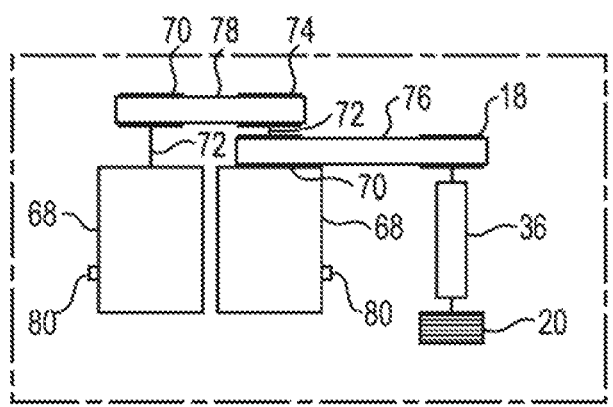
FIG. 2 is a top view of the transfer assembly taken along line 2-2 of FIG. 1.
Figure 3:
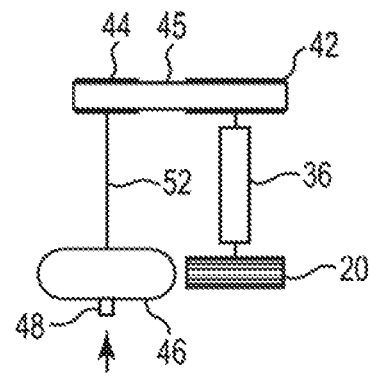
FIG. 3 is a top view of the pump and drive members taken along line 3-3 of FIG. 1.

Referring now to FIGS. 1, 2 and 8, the transfer assembly 10 further includes an air compressor 68. One or more air compressors 68 can be utilized, as needed. Two air compressors 68, 68 are depicted in FIGS. 1, 2 and 8. One would use a second air compressor 68 when one is insufficient for the task at hand. The air compressor 68 is secured to the frame 24. The air compressor 68 can be mounted to any part of the frame 24. As shown, the two air compressors 68, 68 are mounted to the frame 24 and are positioned above the pump 46. This provides easy access to them should maintenance be required.

Referring to FIG. 2, when two air compressors 68, 68 are utilized, the first air compressor 68, the one located closest to the drive pulley 18, has a driven pulley 70 mounted on a drive shaft 72. A second driven pulley 74 can also be mounted on the drive shaft 72 and is located outward of the driven pulley 70. The first air compressor 68 is connected to the drive pulley 18 by a rotatable belt 76. The belt 76 forms a closed loop. The driven pulley 70 can be a sheave, if desired. The second air compressor 68 also has a driven pulley 70 mounted on a drive shaft 72. A rotatable belt 78 connects the driven pulley 70 to the driven pulley 74. The belt 78 forms a closed loop. The driven pulley 74 can be a sheave, if desired. The belt 78 transfers power from the first air compressor 68 to the second air compressor. 68. The air compressors 68, 68 are aligned in parallel. The one or more air compressors 68, 68 can be driven by the drive pulley 18 via a rotatable belt 76.

The air compressor 68 should be designed to operate in the range of from between about 40 HP to about 120 HP. Desirably, each air compressor 68 can operate in a range of from between about 50 Hp to about 110 HP. More desirably, each air compressor 68 can operate at a required horsepower of at least about 65 HP. Even more desirably, each air compressor 68 can operate at a required horsepower of at least about 70 HP. Most desirably, each air compressor 68 can operate at a required horsepower of from between about 60 HP to about 100 HP.

The air compressor 68 can have an air flow range of from between about 10 to about 420 cubic feet per minute (cfm). Desirably, the air flow from the compressor 68 is above 50 cfm. More desirably, the air flow from the compressor 68 is above 100 cfm. Even more desirably, the air flow from the compressor 68 ranges from between about 125 cfm to about 420 cfm. Most desirably, the air flow from the compressor 68 ranges from between about 130 cfm to about 400 cfm.

The air compressor 68 can operate at a pressure range of from between about 70 pounds per square inch (psi) to about 250 psi. Desirably, the air compressor 68 can operate at a pressure of at least 80 psi. More desirably, the air compressor 68 can operate at a pressure of at least about 90 psi. Even more desirably, the air compressor 68 can operate at a pressure at a pressure range of from between about 80 pounds per square inch (psi) to about 240 psi. Most desirably, the air compressor 68 can operate at a pressure at a pressure range of from between about 90 pounds per square inch (psi) to about 230 psi.

Referring again to FIGS. 1, 2 and 4, the air compressor 68 has an outlet 80 which connects to a discharge pipe 82. When two air compressors 68, 68 are present, the outlet 80 from each air compressor 68 can be combined and routed into the discharge pipe 82. The internal diameter of the discharge pipe 82 can vary in size. The internal diameter of the discharge pipe 82 can range from between about 3 inches to about 10 inches. Desirably, the internal diameter of the discharge pipe 82 ranges from between about 4 inches to about 9 inches. More desirably, the internal diameter of the discharge pipe 82 is at least about 4 inches. Even more desirably, the internal diameter of the discharge pipe 82 is at least about 5 inches. Most desirably, the internal diameter of the discharge pipe 82 is equal to or less than about 8 inches. The internal diameter of the discharge pipe 82 should be equal to the internal diameter of the transfer pipe 54. The reason for this is explained below.

Still referring to FIGS. 1, 2 and 4, the discharge pipe 82 connects with the transfer pipe 54 at an intersecting point 84. A ball launcher mechanism 86 is connected to and positioned across the discharge pipe 82. The ball launcher mechanism 86 is positioned downstream of the outlet 80 of the air compressor 68. The ball launcher mechanism 86 is design to have a spherical ball 88 inserted into it such that pressurized air from the air compressor 68 can be used to move the spherical ball 88 through the discharge pipe 82 and then into an through the transfer pipe 54. The spherical ball 88 has an outside diameter approximately equal to the internal diameter of the discharge pipe 82 and the internal diameter of the transfer pipe 54. The spherical ball 88 can be constructed of various materials. The spherical ball 88 can be a solid or a hollow structure. The spherical ball 88 can be formed of a soft material, such as high density foam, low density foam, Styrofoam®, etc. Styrofoam is a trademark for a light resilient polystyrene plastic. Alternatively, the spherical ball 88 could be formed form a semi-hard or a hard material, such as: plastic, a thermoplastic, metal, wood, a composite material, etc.

The spherical ball 88 functions to push or move any fluid, semi-solid and/or solid material which is in front of it. The spherical ball 88 can push fluid or liquid manure out of the discharge pipe 82, the transfer pipe 54, and the flexible hose 64. This action will clear or evacuated all fluid, liquid manure, foreign debris, semi-solids, solids, etc. from the discharge pipe 82, from the transfer pipe 54 and from the flexible hose 64.

Still referring to FIG. 4, the trailing end of the flexible hose 64 can have an applicator bar 90 connected to it. The applicator bar 90 can contain one or more spray nozzles 92. Generally, a plurality of spray nozzles 92 are utilized. The number of spray nozzles 92 can vary. Depending on the length of the applicator bar 90, from 4 to 60 spray nozzles 92 can be present. Desirably, from 10 to about 50 spray nozzles 92 are attached to the applicator bar 90. More desirably, at least 12 spray nozzles 92 are attached to the applicator bar 90. Even more desirably, at least 16 spray nozzles 92 are attached to the applicator bar 90. Most desirably, at least 20 spray nozzles 92 are attached to the applicator bar 90. The spray nozzles 92 function to discharge the water, liquid manure, semi-solids, solids, etc. onto a field.

A ball catching mechanism 94 can be connected to the application bar 90. The ball catching mechanism 94 can be positioned in front of or behind the applicator bar 90. The ball catching mechanism 94 is depicted in FIG. 4 as being located to the rear of the applicator bar 90. The ball catching mechanism 94 should be axially aligned with the trailing end of the flexible hose 64. The ball catching mechanism 94 stops and retains the spherical ball 88 after it has completely passed through the flexible hose 64. The spherical ball 88 can then be retrieved and placed back in the ball launcher mechanism 86. The spherical ball 88 can be used for an extended period of time.

Still referring to FIG. 4, a first control valve 96 is positioned across the transfer pipe 54 and is located downstream of the pump 46. The first control valve 96 is located upstream of the intersecting point 84. A second control valve 98 is positioned across the discharge pipe 82 and is located downstream of the ball launcher mechanism 86. The second control valve 98 is also located upstream of the intersecting point 84. The first and second control valves, 96 and 98 respectively, can vary in design, type, size and shape. The first and second control valves, 96 and 98 respectively, can be hydraulic or pneumatic gate valves. Alternatively, the first and second control valves, 96 and 98 respectively, can be any type of valve, known to those skilled in the art, which can be used to control the flow or a fluid or pressurized air.

The control mechanism 66 can also control the opening and closing of the first and second control valves, 96 and 98 respectively.

Figure 6:
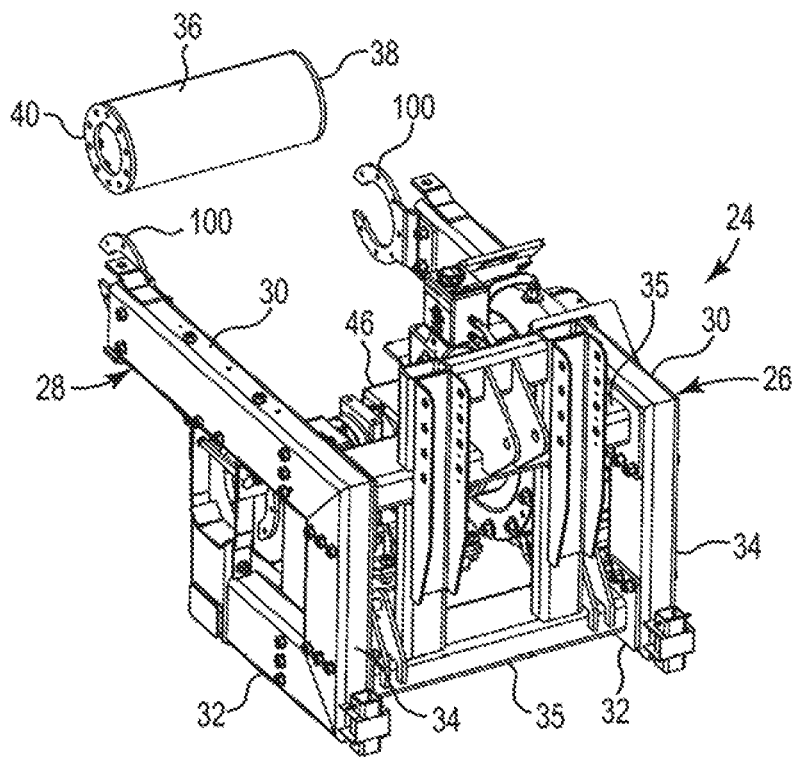
FIG. 6 is an exploded, perspective view of the transfer assembly showing a pair of C-shaped brackets which secure the rotatable cross shaft in place.

Referring to FIG. 6, the frame 24 also includes a pair of C-shaped brackets 100, 100 for supporting bearing mounts (not shown) on the first and second ends 36 and 38 respectively, of the rotatable cross shaft 36. One of the pair of C-shaped brackets 100 contacts the first end 38 of the rotatable cross shaft 36 and the other C-shaped bracket 100 contacts the second end 38 of the rotatable cross shaft 36. The pair of C-shaped brackets 100, 100 face or extend towards the engine 16 of the agricultural vehicle 14. Each of the pair of C-shaped brackets 100, 100 is attached to one of the upper arms 30, 30 of each of the first and second members, 26 and 28 respectively. The unique shape of the pair of C-shaped brackets 100, 100 permits the rotatable cross shaft 36 to be removed, when required, in an efficient manner.

Referring again to FIG. 1, when the transfer assembly 10 utilizes a centrifugal pump 46, it is beneficial to also utilize a feeder pump 102 to prime the pump 46. The feeder pump 102 can vary in type, design, size, shape and construction. The feeder pump 102 has an inlet 104 and an outlet 106. The feeder pump 102 can be immersed in a holding tank 105 that is retaining water, liquid manure, semi-solids, solids, etc. The fluid, liquid manure, semi-solids, solids, etc. will be drawn into the inlet 104 when the feeder pump 102 is activated. The control mechanism 66 can also be wired to operate the feeder pump 102 so as to turn it on and off. A supply hose 108 is connected between the outlet 106 of the feeder pump 102 and the inlet 48 of the pump 46. The fluid, liquid manure, semi-solids, solids, etc. present in the holding tank 105 are routed to the pump 46 when the feeder pump 102 is turned on. From the feeder pump 102, the fluid, liquid manure, semi-solids, solids, etc. can be routed to the pump 46 by a supply line 108.

A pair of hydraulic lines 110 and 112 is connected between the agricultural vehicle 14 and the feeder pump 102. One line 110 will supply hydraulic fluid to the feeder pump 102 and the other line 112 will remove hydraulic fluid from the feeder pump 102. The hydraulic fluid is used to operate the feeder pump 102.

Method

A method of using a transfer assembly 10 which is removably attached to a front portion 12 of an agricultural vehicle 14 will now be discussed. The agricultural vehicle 14 has an engine 16 equipped to deliver at least 250 horsepower, a drive pulley 18, a first driven pulley 20, and a rotatable belt 22. The rotatable belt 22 connects the engine 16 to the drive pulley 18, connects the drive pulley 18 to the first driven pulley 20 and connects the first driven pulley 20 to the engine 16.

The transfer assembly 10 includes a frame 24 removably secured to the front portion 12 of the agricultural vehicle 14. The frame 24 has a first member 26 spaced apart from a second member 28. Each of the first and second members, 26 and 28 respectively, has an upper arm 30, a lower arm 32 and a connecting arm 34 joining the upper and lower arms, 30 and 32 respectively, together. At least one cross member can be secured between the first and second members. A rotatable cross shaft 36 is positioned between the upper arms 30, 30 of the first and second members, 26 and 28 respectively. The rotatable cross shaft 36 has a first end 38 axially connected to the first driven pulley 20, which is located outward of the first member 26, and a second end 40. A second driven pulley 42 is located outward of the second member 28 and is axially connected to the second end 40 of the rotatable cross shaft 36. A third driven pulley 44 is located outward of the second member 28 and is rotatably connected to the second driven pulley 42.

A pump 46 is secured to the first member 26 and is positioned between the first and second members, 26 and 28 respectively. The pump 46 has a fluid inlet 48 and a fluid outlet 50. The pump 46 also has an outwardly extending drive shaft 52 connected to the third driven pulley 44. A transfer pipe 54, having a first end 56 and a second end 58 is connected by the first end 56 to the fluid outlet 50 of the pump 46. The transfer pipe 54 extends to a rear portion 60 of the agricultural vehicle 14 for routing fluid away from the pump 46.

A coupling 62 is connected to the second end 58 of the transfer pipe 54. The coupling 62 enables a flexible hose 64 to be connected thereto. An air compressor 68 is secured to the frame 24 and can be positioned above the pump 46. The air compressor 68 is driven by the drive pulley 18. The air compressor 68 has an outlet 80 connected to a discharge pipe 82. The discharge pipe 82 connects with the transfer pipe 54 at an intersecting point 84. The discharge pipe 82 and the transfer pipe 54 have the same internal diameter. A first control valve 96 is positioned across the transfer pipe 54 and a second control valve 98 is positioned across the discharge pipe 82. The first control valve 96 is located upstream of the intersecting point 84.

A ball launcher mechanism 86 is connected to the discharge pipe 82. The ball launcher mechanism 86 is positioned downstream of the outlet 80 of the air compressor 68.

The method includes the steps of attaching the transfer assembly 10 onto a front portion 12 of the agricultural vehicle 14. The front portion 12 of the agricultural vehicle 14 is then positioned adjacent to a holding tank 105 containing a fluid, liquid manure, semi-solids, solids, etc. The inlet 48 of the pump 46 is then connected to the fluid, liquid manure, semi-solids, solids, etc. present in the holding tank 105. This can be accomplished by using a feeder pump 102 which is placed in the holding tank 105 and having a supply hose 108 connected to the inlet 48 of the pump 46 or by placing a hose into the fluid retained in the holding tank 105 and connecting the opposite end of the hose to the inlet 48 of the pump 46.

The trailing end of the flexible hose 64 is positioned in a field and the leading end of the flexible hose 64 is connected to the coupling 62 located on the transfer pipe 54. The engine 16 is then started and power is supplied to the pump 46, and to the feeder pump 102 when present, for routing the fluid, liquid manure, semi-solids, solids, etc. from the holding tank 105 through the flexible hose 64 and onto the field. The pump 46 can be turned off when the task is completed using the control mechanism 66.

The method further includes the steps of shutting the first control valve 96 and opening the second control valve 98 using the control mechanism 66. A spherical ball 88 is placed in the ball launcher mechanism 86. The spherical ball 88 has an outside diameter approximately equal to the internal diameter of the discharge pipe 82, equal to the internal diameter of the transfer pipe 54, and equal to the internal diameter of the flexible hose 64. The air compressor 68 is then turned on and pressurized air is supplied behind the spherical ball 88 to push and move it through the discharge pipe 82, pass the second control valve 98, through the transfer pipe 54 and then through the flexible hose 64. This movement of the spherical ball 88 will cause the fluid, liquid manure, semi-solids, solids, etc. to be evacuated from the flexible hose 64. Once the spherical ball 88 has passed completely through the flexible hose 64, the air compressor can be turned off using the control mechanism 66. The spherical ball 88 can then be removed from the flexible hose 64 or from a ball catching mechanism 94 attached to the applicator bar 90.

After the fluid, liquid manure, semi-solids, solids, etc. has been removed from the flexible hose 64 by the spherical ball 88, the first control valve 96 can be opened and the second control valve can be closed using the control mechanism 66. The transfer assembly 10 is then ready to start a new job.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A transfer assembly for an agricultural vehicle, said agricultural vehicle having an engine equipped to deliver at least 250 horsepower, a drive pulley, a first driven pulley, and a rotatable belt, said rotatable belt connecting said engine to said drive pulley, connecting said drive pulley to said first driven pulley and connecting said first driven pulley to said engine, said transfer assembly comprising:

a frame removably secured to a front portion of said agricultural vehicle, said frame having a first member spaced apart from a second member, each of said first and second members having an upper arm, a lower arm and a connecting arm joining said upper and lower arms together, and at least one cross member securing said first member to said second member;

a rotatable cross shaft positioned between said upper arms of said first and second members, said rotatable cross shaft having a first end connected to said first driven pulley at a central axis of the first driven pulley, said rotatable cross shaft located opposite the connecting arm of said first member, and said rotatable cross shaft having a second end;

a second driven pulley located opposite the connecting arm of said second member, and said second driven pulley being connected to said second end of said rotatable cross shaft at a central axis of the second driven pulley;

a third driven pulley located between the second driven pulley and the connecting arm of said second member and rotatably connected to said second driven pulley;

a pump secured to said first member, said pump having a fluid inlet and a fluid outlet, and said pump having a longitudinally extending drive shaft connected to said third driven pulley;

a transfer pipe having a first end and a second end, said first end is connected to said fluid outlet of said pump, and said transfer pipe extending to a rear portion of said agricultural vehicle for routing fluid away from said pump;

a coupling connected to said second end of said transfer pipe, said coupling enabling a flexible hose to be connected thereto; and a control mechanism for operating said pump.

2. The transfer assembly of claim 1 further comprising an air compressor secured to said frame, said air compressor being driven by said drive pulley and having an outlet connected to a discharge pipe, and said discharge pipe connecting with said transfer pipe at an intersecting point.

3. The transfer assembly of claim 2 further comprising a first control valve positioned across said transfer pipe and a second control valve positioned across said discharge pipe, and said first control valve being located upstream of said intersecting point.

4. The transfer assembly of claim 3 further comprising a ball launcher mechanism connected to said discharge pipe, said ball launcher mechanism positioned downstream of said outlet of said air compressor and upstream of said second control valve.

5. The transfer assembly of claim 1 wherein said pump is a centrifugal pump.

6. The transfer assembly of claim 1 wherein said pump is a rotary lobe pump.

7. The transfer assembly of claim 1 further comprising a pair of C-shaped brackets for supporting said rotatable cross shaft, wherein free ends of the pair of C-shaped brackets face a front portion of the vehicle and one of said pair of C-shaped brackets being attached to each of said upper arms of said first and second members.

8. The transfer assembly of claim 2 wherein said transfer pipe has an internal diameter and said discharge pipe has an internal diameter, said internal diameter of said transfer pipe is equal to said internal diameter of said discharge pipe, and each pipe has an internal diameter of about 4 inches.

9. The transfer assembly of claim 1 wherein said first driven pulley has an outside diameter, said second driven pulley has an outside diameter, and said third driven pulley has an outside diameter, said outside diameter of said second driven pulley is equal to said outside diameter of said first driven pulley, and said outside diameter of said third driven pulley is less than said outside diameter of said second driven pulley.

10. A transfer assembly for an agricultural vehicle, said agricultural vehicle having an engine equipped to deliver at least 250 horsepower, a drive pulley, a first driven pulley, and a rotatable belt, said rotatable belt connecting said engine to said drive pulley, connecting said drive pulley to said first driven pulley and connecting said first driven pulley to said engine, said transfer assembly comprising:
- a frame removably secured to a front portion of said agricultural vehicle, said frame having a first member spaced apart from a second member, each of said first and second members having an upper arm, a lower arm and a connecting arm joining said upper and lower arms together, and at least one cross member securing said first member to said second member;
- a rotatable cross shaft positioned between said upper arms of said first and second members, said rotatable cross shaft having a first end connected to said first driven pulley at a central axis of the first driven pulley, said rotatable cross shaft located opposite the connecting arm of said first member, and said rotatable cross shaft having a second end;
- a second driven pulley located opposite the connecting arm of said second member, and said second driven pulley being connected to said second end of said rotatable cross shaft at a central axis of the second driven pulley;
- a third driven pulley located between the second driven pulley and the connecting arm of said second frame member and rotatably connected to said second driven pulley;
- a pump secured to said first member, said pump having a fluid inlet and a fluid outlet, and said pump having a longitudinally extending drive shaft connected to said third driven pulley;
- a transfer pipe having a first end and a second end, said first end is connected to said fluid outlet of said pump, and said transfer pipe extending to a rear portion of the agricultural vehicle for routing fluid away from said pump;
- a coupling connected to said second end of said transfer pipe, said coupling enabling a flexible hose to be connected thereto;
- an air compressor secured to said frame, said air compressor being driven by said drive pulley, said air compressor having an outlet connect to a discharge pipe, and said discharge pipe connecting with said transfer pipe at an intersecting point; and
- a control mechanism for operating said pump and said air compressor.

11. The transfer assembly of claim 10 wherein said transfer pipe has an internal diameter and said discharge pipe has an internal diameter, said internal diameter of said transfer pipe is equal to said internal diameter of said discharge pipe, and each pipe has an internal diameter of about 5 inches.

12. The transfer assembly of claim 10 further comprising a first control valve positioned across said transfer pipe and a second control valve positioned across said discharge pipe, and said first control valve being located upstream of said intersecting point.

13. The transfer assembly of claim 12 further comprising a ball launcher mechanism connected to said discharge pipe, said ball launcher mechanism positioned downstream of said air compressor outlet and upstream of said second control valve.

14. The transfer assembly of claim 10 further comprising a pair of C-shaped brackets for supporting said rotatable cross shaft, wherein free ends of the pair of C-shaped brackets face a front portion of the vehicle and one of said pair of C-shaped brackets being attached to each of said upper arms of said first and second members.

15. The transfer assembly of claim 10 wherein said first driven pulley has an outside diameter, said second driven pulley has an outside diameter, and said third driven pulley has an outside diameter, said outside diameter of said second driven pulley is equal to said outside diameter of said first driven pulley, and said outside diameter of said second driven pulley is greater than said outside diameter of said third driven pulley, and said pump has a flow rate of from between about 700 to about 5,000 gallons per minute.

16. A method of using a transfer assembly which is removably attached to a front portion of an agricultural vehicle, said agricultural vehicle having an engine equipped to deliver at least 250 horsepower, a drive pulley, a first driven pulley, and a rotatable belt, said rotatable belt connecting said engine to said drive pulley, connecting said drive pulley to said first driven pulley and connecting said first driven pulley to said engine, said transfer assembly including a frame removably secured to a front portion of said agricultural vehicle, said frame having a first member spaced apart from a second member, each of said first and second members having an upper arm, a lower arm and a connecting arm joining said upper and lower arms together, and at least one cross member securing said first member to said second member; a rotatable cross shaft positioned between said upper arms of said first and second members, said rotatable cross shaft having a first end connected to said first driven pulley at a central axis of the first driven pulley, said rotatable cross shaft being located opposite the connecting arm of said first member, and said rotatable cross shaft having a second end; a second driven pulley located opposite the connecting arm of said second member, said second driven pulley being connected to said second end of said rotatable cross shaft at a central axis of the second driven pulley; a third driven pulley located between the second driven pulley and the connecting arm of said second member and rotatably connected to said second driven pulley; a pump secured to said first member, said pump having a fluid inlet and a fluid outlet, and said pump having a longitudinally extending drive shaft connected to said third driven pulley; a transfer pipe having a first end and a second end, said first end connected to said fluid outlet of said pump, said transfer pipe extending to a rear portion of said agricultural vehicle for routing fluid away from said pump; a coupling connected to said second end of said transfer pipe, said coupling enabling a flexible hose to be connected thereto; and an air compressor secured to said frame and being driven by said drive pulley, said air compressor having an outlet connect to a discharge pipe, and said discharge pipe connecting with said transfer pipe at an intersecting point, said discharge pipe and said transfer pipe having the same internal diameter, a first control valve positioned across said transfer pipe and a second control valve positioned across said discharge pipe, said first control valve being located upstream of said intersecting point, a ball launcher mechanism connected to said discharge pipe and being positioned downstream of said outlet of said air compressor, said method comprising the steps of:
- attaching said transfer assembly to the front portion of said agricultural vehicle;
- positioning said front portion of said agricultural vehicle adjacent to a holding tank;
- fluidly connecting said pump to said fluid retained in said holding tank;
- positioning a trailing end of said flexible hose in a field and attaching a leading end of said flexible hose to said coupling on said transfer pipe;

starting said engine and supplying power to said pump for routing said fluid from said holding tank through said flexible hose to said field; and turning off said pump.

17. The method of claim 16 further comprising the steps of:

shutting said first control valve and opening said second control valve;

placing a spherical ball in said ball launcher mechanism, said spherical ball having an outside diameter approximately equal to said internal diameter of said discharge pipe and equal to said internal diameter of said transfer pipe; and turning on said air compressor and supplying pressurized air to move said spherical ball through said discharge pipe, past said second control valve, and into said transfer pipe, and providing further movement of said spherical ball through said flexible hose which causes said fluid to evacuate said flexible hose.

18. The method of claim 17 further comprising moving said spherical ball completely through said flexible hose.

19. The method of claim 18 further comprising turning off said air compressor, and removing said spherical ball from said flexible hose.

20. The method of claim 17 further comprising opening said first control valve and closing said second control valve, and utilizing a feeder pump to prime said pump.

* * * * *